June 2, 1964  G. W. SCHEPER, JR  3,135,496
AXIAL FLOW TURBINE WITH RADIAL TEMPERATURE GRADIENT
Filed March 2, 1962  2 Sheets-Sheet 1
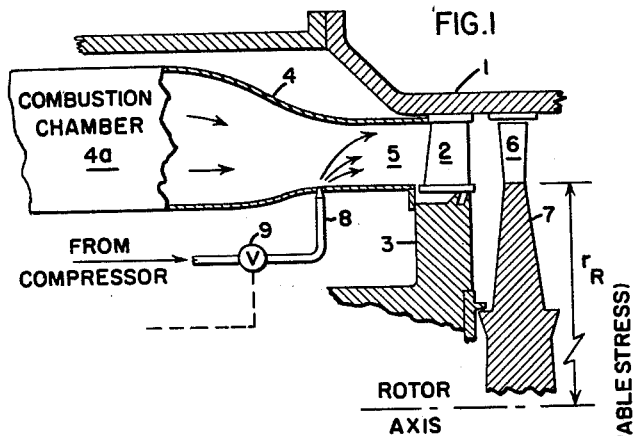
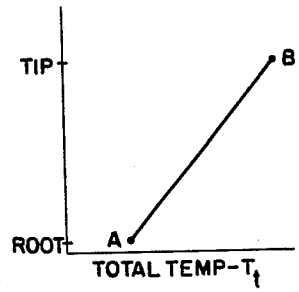
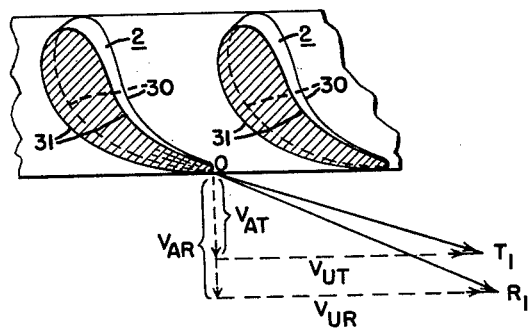
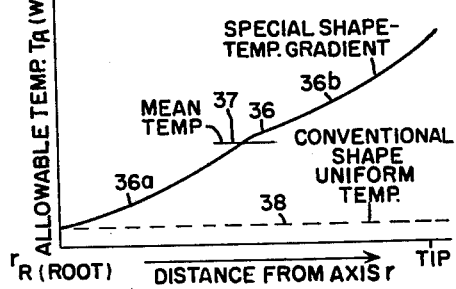
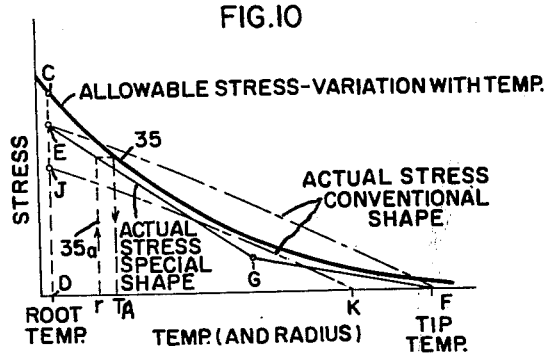
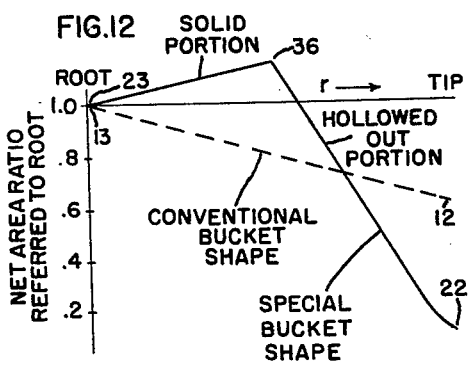
INVENTOR:
GEORGE W. SCHEPER, JR.
BY *W. C. Crutcher*
HIS ATTORNEY.

June 2, 1964     G. W. SCHEPER, JR     3,135,496
AXIAL FLOW TURBINE WITH RADIAL TEMPERATURE GRADIENT
Filed March 2, 1962     2 Sheets-Sheet 2

INVENTOR:
GEORGE W. SCHEPER, JR.
BY   W. C. Crutcher
HIS ATTORNEY.

United States Patent Office 3,135,496
Patented June 2, 1964

3,135,496
AXIAL FLOW TURBINE WITH RADIAL TEMPERATURE GRADIENT
George W. Scheper, Jr., Schenectady, N.Y., assignor to General Electric Company, a corporation of New York
Filed Mar. 2, 1962, Ser. No. 177,059
8 Claims. (Cl. 253—39.15)

This invention relates to improvements in turbines operating with high-temperature elastic fluid, and more particularly to a more efficient axial flow gas turbine design with improved correlation between bucket materials, operating temperatures, and aerodynamic characteristics.

It is known that higher initial operating temperatures in an elastic fluid turbine, such as an axial flow gas turbine, will generally give higher cycle thermal efficiency and specific power. The limiting factor in present-day design to raising gas turbine operating temperatures is the physical capability of the material used in the highly stressed turbine buckets at these temperatures. This is because the allowable stress to which the buckets can be subjected for a given bucket "life" decreases with increasing temperature. Although allowable stress can be raised somewhat by resorting to the use of more expensive alloys or special cooling designs, the cost of such measures may well counteract any improved efficiency resulting therefrom.

Turbines buckets are generally made individually and attached to the rim of the turbine wheel so as to extend radially. They are subjected to a tensile stress in the radial direction due to centrifugal force as the wheel rotates. This stress, due to the weight of the bucket itself, is generally the greatest near the root or radially inner portion of the bucket vane where it is attached to the wheel, and it decreases toward the bucket tip or radially outer portion, reaching a value of zero stress at the bucket tip. The stress at any bucket cross-section will depend on the rotor speed, the area of the cross-section, and the distribution of the metal radially outward from the cross-section. For a bucket of constant cross-sectional area from root to tip, the radial stress gradient will be generally parabolic in form. Conventional turbine design, however, usually employs a bucket tapered to decrease in area from root to tip, so as to decrease the stress at the root.

Since the "root stress" is generally the greatest, and since the gas temperature sets the allowable stress for the particular bucket material, the root stress at a specified temperature is generally taken as the limiting factor and the remainder of the bucket is designed, using the bucket shape at the root as a reference, to achieve a desired extraction of energy from the motive fluid with proper aerodynamic efficiency and stability. However, the conventional approaches to determining the "blade angles," and the blade cross-section area at a fixed temperature over the radial height, etc., are inherently wasteful of the potential capabilities of the bucket material in the outer lesser stressed portions of the bucket to withstand higher temperatures.

A commonly used design philosophy assumes a constant temperature of motive fluid from bucket root to tip, and the combustion chambers and flow ducts supplying the first-stage nozzle and first-stage bucket are designed accordingly. Actually, the radially outer portions of the bucket are capable of withstanding a much higher temperature due to the lower stresses. Utilization of this fact would provide a higher mean gas temperature and hence higher thermal efficiency. However, present design philosophies, such as the "free vortex" design (for instance as disclosed in U.S. Patent 2,378,372 issued June 12, 1945 in the name of Frank Whittle), are based on the assumption of constant temperature motive fluid. The "free vortex" principle recognizes that radial equilibrium of the fluid requires the fluid to rotate more rapidly (have a higher tangential velocity component) near the radially inner parts of the flow annulus as it flows axially through the bucket-wheel. In other words, the "whirl velocity," or tangential component of the absolute gas velocity leaving the first-stage nozzle should be greater near the root of the bucket than near the tip, in order to provide radial equilibrium and, if constant stagnation temperature and stagnation pressure of the gas is assumed, free vortex design will be achieved if the tangential velocity component of gas leaving the first-stage nozzle is inversely proportional to the radius (distance from the axis of rotation) and if the axial component is constant over the height of the bucket. This may be expressed by the formula $$V_U = V_{UR}\left(\frac{r_R}{r}\right) \quad (1)$$

where $V_U$ is the tangential component of the absolute velocity of the gas leaving the nozzle at any radius $r$, and where $V_{UR}$ is the same velocity component at the root or reference radius $r_R$.

It has been suggested in U.S. Patent 2,426,270 issued to A. R. Howell on August 26, 1947, that blades of axial flow compressors might be designed so as to minimize compressibility or cavitation by choosing the local Mach number as a design parameter, where the local Mach number was defined as the velocity relative to the blade, divided by the local acoustic velocity. One feature of the present invention is to employ an expression designated as "tangential Mach number" as a design parameter. The tangential Mach number $M_U$ is defined here as the tangential component of the absolute velocity leaving the nozzle at a given radius divided by the local acoustic velocity at the same radius. It is to be understood, however, that the tangential Mach number is employed for convenience of mathematical expression and has no real physical significance, as does the local Mach number defined in the aforementioned Patent 2,426,270.

Accordingly, one object of the present invention is to provide an improved axial flow turbine design which allows an increased initial mean operating temperature.

Another object of the invention is to provide a turbine bucket which utilizes the bucket material to a greater extent so as to more fully achieve its inherent capabilities.

Still another object of the invention is to provide an improved method of designing a turbine nozzle and bucket to make effective use of radial temperature gradients.

Another object of the invention is to provide a turbine bucket designed by varying a parameter which includes the effect of radial temperature gradients.

Yet another object of the invention is to provide a turbine bucket which achieves optimum correlation between allowable stress, operating temperature, and aerodynamic stability.

These and many other objects of the invention may best be understood by reference to the following description taken in connection with the accompanying drawings in which:

FIG. 1 is a longitudinal section of a portion of an axial flow gas turbine showing the first-stage nozzle ring and first-stage turbine bucket wheel.

FIG. 2 is a graph showing the radial temperature gradient in the motive fluid of the turbine of FIG. 1;

FIG. 5 is a plan view of two first-stage nozzle partitions according to the invention with associated absolute gas velocity vectors;

FIG. 10 is a graph of actual and allowable stress vs. temperature;

FIG. 11 is a graph of bucket dimension vs. allowable local bucket temperature; and FIG. 12 is a graph of normalized net cross-sectional area of a bucket vs. bucket dimension.

Figure 3:
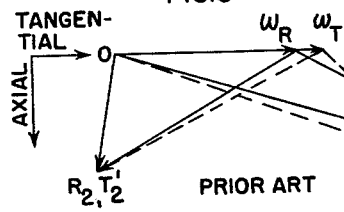
FIG. 3 is a velocity vector diagram of a typical "free vortex" design.

Briefly stated, the invention is practiced by providing means to "slant" the temperature profile of the hot gas entering the first-stage nozzle so that the gas temperature increases with the radius, being much higher toward the outer part of the flow annulus than has previously been thought practicable. The nozzle and bucket blade angles are then designed, with the aid of the velocity diagram, so as to cause the tangential Mach number of the gas to vary inversely with the radius, a procedure which gives radial equilibrium of the gas while compensating for its gradient in temperature. The bucket is then designed to have a "gross" (exposed to the gas) cross-section which increases with radius to provide aerodynamic stability, while at the same time its "net" (actual metal) cross-section is caused to vary as a more complicated function of the radius. This is done in such a manner as to cause the actual stress distribution from root to tip to substantially conform with the allowable stress of the selected bucket material for the selected radial temperature gradient.

Referring now to FIG. 1 of the drawing, the portion of the gas turbine shown includes an outer casing 1 supporting a group of circumferentially-spaced, radially-extending nozzle partitions 2. The inner ends of the nozzle partitions are held stationary on inner stator member 3. A thin transition wall 4 directs hot gases from the combustion chamber 4a to an annular flow duct 5 preceding nozzles 2. The gas leaving nozzles 2 flows between buckets 6 mounted on the periphery of the turbine wheel 7. Other downstream nozzles and buckets (not shown) may extract additional energy from the gases.

Although the hot gas arriving at the flow annulus 5 would normally be made to have relatively uniform temperature distribution, the temperature profile is altered in accordance with the invention by means of controlled jets of air directed substantially perpendicular to the hot gas flow by means of a series of pipes such as the one at 8. The gas injected through pipes 8 is substantially cooler than the hot gas leaving the combustion chamber and may be supplied from any suitable source, such as the compressor of the gas turbine power plant (not shown). A suitable regulating valve 9 may be manually or automatically controlled to adjust the "temperature profile" radially across the passage 5.

FIG. 2 of the drawing indicates the "slanted" temperature profile obtained with the apparatus of FIG. 1. As will be seen from FIG. 2, the temperature A toward the radially inner part of annulus 5 increases gradually to a point B of much higher temperature toward the radially outer portion of the annulus. The temperature at A, therefore, corresponds to the root temperature of the blades, whereas the temperature B corresponds to the tip temperature and is much higher than for normal designs. It should be understood that the temperature of FIG. 2 is "stagnation temperature" or total temperature $T_t$, which includes both the kinetic and internal energy of the gas.

According to one practice of turbine design, the nozzle and blade angles may be calculated at a particular radius of reference (here the root radius) by making certain routine assumptions, and then the gas velocities and blade angles may be varied from those of the reference radius in order to achieve a desired aerodynamic relationship at different radii. For example, in the "free vortex" design which assumes constant gas temperature over the blade height, the nozzle and blade angles are caused to conform to a flow pattern, wherein the whirl velocity or tangential velocity component of the gas varies inversely with the radius and where the axial velocity component is constant over the blade height, as in Equation 1.

The vector diagram for a prior art free vortex design may be seen by reference to FIG. 3, wherein the vectors $OW_R$ and $OW_T$ represent the tangential velocities of the bucket root and bucket tip respectively. The vector $OR_1$ is the absolute gas velocity leaving the nozzle at the root. Thus, the difference between vector $OR_1$ and the bucket root velocity $OW_R$ is the entering gas velocity relative to the bucket $W_R R_1$. The orientation of the bucket root at entry of the gas should be approximately along line $W_R R_1$.

The direction of the gas leaving the bucket is determined by the bucket exit angle and appears on the velocity diagram as line $W_R R_2$. The absolute velocity of gas leaving the bucket at the root radius is given by line $OR_2$.

Once the vectors for the root radius have been established as a reference, the proper blade angles at various radii can be constructed by the previously mentioned relation $$V_U = V_{UR}\left(\frac{r_R}{r}\right) \qquad (1)$$

As an example, the vectors for the bucket tip radius, determined according to Equation 1, are shown in dotted lines on FIG. 3. The following points should be noted. The vectors $W_R R_1$ and $W_T T_1'$ which represent the velocities of the gas relative to the buckets at the bucket root and tip respectively are oriented at different angles. This manifests itself as a twist or warp in the bucket in order to cause it to conform to the free vortex condition previously established. Similarly, the vectors $OR_1$ and $OT_1'$ representing the gas velocity leaving the nozzle, indicate that the nozzle is also warped to conform with the free vortex principle.

Figure 6:
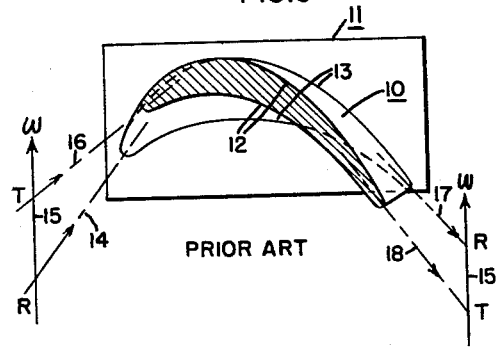
FIGS. 6 and 7 are plan views and elevation views respectively of a typical "free vortex bucket" in accordance with the prior art.
Figure 7:
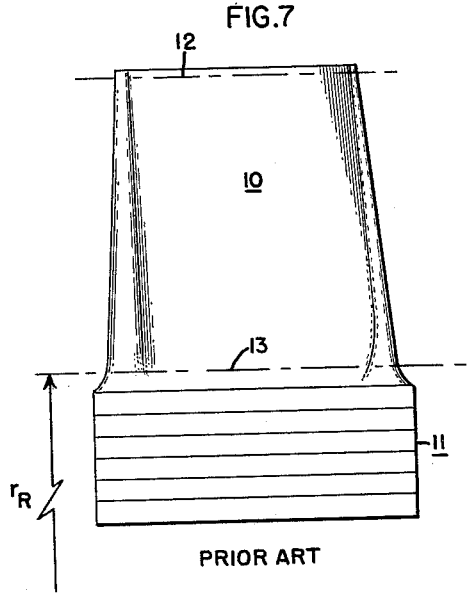

Reference to a typical "prior art" free vortex bucket as shown in FIGS. 6 and 7 will make this fact more apparent. FIG. 6 indicates a single bucket 10 disposed on base 11. The bucket tip profile 12 is cross-hatched to distinguish it from the root profile 13. The entry of the gas at the root profile is along line 14, while the entry of the gas at the bucket tip is along line 16. It should be noted that root entry line 14 subtends a lesser angle with the tangential line 15 than does the root entry line 16. Similarly, the direction of the gas leaving bucket 10 at the root is generally directed along the line 17, while that leaving the bucket at the tip is directed along the line 18. These lines of gas entry and exit relative to bucket 10 have their counterparts on the FIG. 3 velocity diagram of the typical free vortex bucket discussed, where the relative root entry line 14 corresponds to vector $W_R R_1$, and the line of entry at the tip 16 corresponds to vector $W_T T_1'$. Line 17 of FIG. 6 corresponds to vector $W_R R_2$, while line 18 corresponds to $W_T T_2'$.

FIGS. 6 and 7 indicate another common feature found in conventional blading. It will be observed that the blade is tapered from root to tip in cross-sectional area. In other words, the net cross-sectional area of the tip profile 12 is less than the net cross-sectional area of the root profile 13. This is done in order to reduce the root stress and to provide a more suitable aerodynamic shape at the tip for the reduced turning angle of the relative gas stream.

Figure 4:
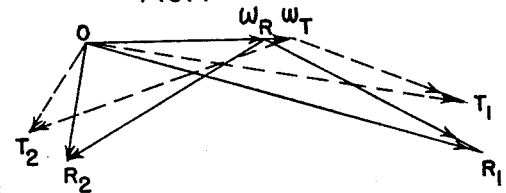
FIG. 4 is a vector diagram for the invention, employing the same root velocities as in FIG. 3 for comparison.

FIG. 4 of the drawing indicates the velocity diagram for a bucket constructed in accordance with the invention. The root or reference vectors are the same as in FIG. 3 in order to facilitate comparison of the designs. The radial variation of bucket entry and exit angles from root to tip is derived, however, not from the free vortex principle, but from the relation $$M_U = M_{UR}\left(\frac{r_R}{r}\right) \quad (2)$$

where $M_U$ is the angential Mach number at any radius $r$ from the axis of rotation, and where $M_{UR}$ is the tangential Mach number of the root radius $r_R$. The tangential Mach number is defined as the tangential component of the absolute gas velocity $V_U$ leaving the nozzle, divided by the local sonic velocity of the gas $V_S$ at the same location.

It will be observed from FIG. 4 that the relative gas velocity at the bucket tip $W_T T_1$ indicates entry angle of the gas with respect to the entry angle of the gas at the root $W_R R_1$, which is just the reverse of the relationship shown in FIG. 3.

Figure 8:
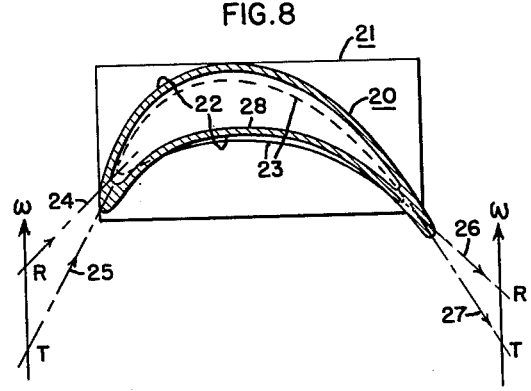
FIGS. 8 and 9 are plan and elevation views of a turbine bucket according to the invention, having the same root cross-sections as in FIGS. 6 and 7, for comparison.
Figure 9:
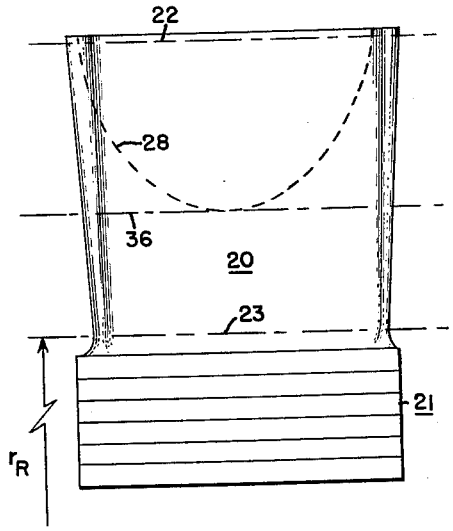

Reference to FIGS. 8 and 9 shows plan and elevation views respectively of a bucket constructed corresponding to the vector diagram of FIG. 4. There the bucket 20 is disposed on a base 21 and has a tip profile indicated by the closed line 22 and a root profile, indicated by the closed line 23. The mean direction of entry of the gas relative to the bucket at the root is indicated by line 24 and the corresponding direction of entry at the tip by line 25. Similarly, the mean direction of exit of the gas relative to the bucket at the root is indicated by line 26 and at the tip by line 27. Line 24 corresponds to FIG. 4 vector $W_R R_1$, line 25 corresponds to vector $W_T T_1$, line 26 corresponds to vector $W_R R_2$, and line 27 corresponds to vector $W_T T_2$ in FIG. 4.

As seen in FIG. 9, the gross cross-sectional area of the bucket is caused to increase with the radius. The gross cross-sectional area is defined as the area "seen" by the gas at any radius. In the embodiment shown, the gross cross-sectional area is caused to vary as given by the expression $$A = A_R\left(\frac{r}{r_R}\right)^2 \quad (3)$$

were A is the gross cross-sectional area at any radius $r$, and where $A_R$ is the gross cross-sectional area at the root radius $r_R$.

Also, for reasons which will be later explained, the net or actual cross-sectional area of bucket material is caused to vary as a more complex function of the radius by hollowing out the tip portion of the bucket as indicated by recess 28, thus forming an empty pocket in the tip of the bucket. FIG. 12 shows a graph of net cross-sectional area variation from root to tip as compared to a conventional bucket. The area is normalized by referring it to a root area of unity for both buckets.

The actual stress on the bucket at various radii depends, in part, upon the radial distribution of bucket material which is measured at any given radius by the net cross-sectional area. It will be observed from FIGS. 9 and 12 that the net cross-sectional area increases with the radius until the pocket 28 is reached (due to the gross area variation), whereafter the net cross-sectional area decreases with the radius, the precise variation of net cross-sectional area being shown in FIG. 12.

Referring to FIG. 5 of the drawing, two of the nozzle partitions 2 are shown, which provide the absolute gas velocities $OT_1$ and $OR_1$ which are used to enter the velocity diagram of FIG. 4. The root profiles of nozzle partitions 2 are indicated by contoured line 30, whereas the tip profiles are indicated by contoured line 31. As explained previously, the absolute gas velocity $OR_1$ leaving the nozzle at the root is calculated to be used as a reference by making assumptions based on previous experience and ideal flow. Then the remainder of the nozzle exit angles at other radii are calculated according to the formula $$M_U = M_{UR}\left(\frac{r_R}{r}\right) \quad (2)$$

The root profile 30 produces an absolute gas velocity $OR_1$ while the tip profile 31 produces absolute gas velocity $OT_1$. The axial and tangential components of these absolute gas velocities leaving the nozzle are indicated by the quantities $V_A$ and $V_U$ respectively, with additional subscripts to indicate the radius.

It will again be observed by those having a knowledge of the usual configuration of nozzle partitions that the twist or warp of the nozzle partitions of FIG. 5 is reversed from the conventional warp. In other words, the angle subtended between the direction of leaving gas and the tangential line is greater at the nozzle root than at the nozzle tip. This is a consequence of designing according to the disclosed formula wherein the tangential Mach number varies inversely with the radius, and where the temperature is significantly higher toward the tip.

An explanation of the design criteria of the invention as opposed to the constant temperature free vortex design is as follows. The free vortex principle achieves radial equilibrium of the fluid by means of certain assumptions, together with the requirement that the angular momentum of the fluid is constant over the entry plane at any radius. However, a more general expression for radial equilibrium can be derived from Euler's equation for fluid flow which, by assuming radial equilibrium, steady state, axial symmetry, and zero external force, reduces to the expression $$\frac{dP}{dr} = \frac{\rho V_U^2}{gr} \quad (4)$$

where $P$ is the static pressure,
$\rho$ is the gas density
$g$ is the gravitational constant and the other symbols are as indicated previously.

As mentioned previously, the tangential Mach number $M_U$ is related to the tangential component of the gas leaving the nozzle $V_U$ and the local sonic velocity $V_S$ at the same point by the expression $$M_U = \frac{V_U}{V_S} \quad (5)$$

Recognizing the fact that for a compressible fluid where $$V_S = \sqrt{kgR_gT} \quad (6)$$

and $$P = R_g T \rho \quad (7)$$

Equation 4 reduces to the following expression:

$$\frac{dP}{P} = kM_U^2\left(\frac{dr}{r}\right) \quad (8)$$

Now for the special case where Equation 2 applies, i.e., tangential Mach number inversely proportional to radius, the solution for Equation 8 which gives the static pressure P at any radius $r$ is as follows:

$$\frac{P}{P_R} = \epsilon^{\frac{kM_{UR}^2}{2}\left[1-\left(\frac{r}{r_R}\right)^2\right]} \quad (9)$$

This expression gives the pressure P at any radius $r$ related to the pressure $P_R$ at the root radius $r_R$, which is necessary to achieve radial equilibrium of the gas and which is true regardless of the temperature distribution of the gas. Hence, Equation 9 is applicable to gas with a slanted temperature profile, such as given by the graph of FIG. 2.

The conditions ahead of the nozzle can be measured and, since the desired static pressure P at a given radius $r$ at the nozzle exit can be calculated from Equation 9, the total velocity V at the same radius can be calculated from standard graphs or from the known expression relating the total absolute velocity to the pressure drop across the nozzle as follows:

$$V = \sqrt{\left(\frac{2k}{k-1}\right)\frac{P_1}{\rho_1}\left[1-\left(\frac{P}{P_1}\right)^{\frac{k-1}{k}}\right]} \quad (10)$$

where $k$ is the adiabatic exponent, and where $P_1$ and $\rho_1$ are the gas pressure and density ahead of the nozzle at the same radius $r$.

Now that we know the absolute velocity at the chosen radius $r$, the static temperature $T$ at that radius can be calculated, since the total temperature or stagnation temperature $T_t$ ahead of the nozzle is known from the temperature profile of FIG. 2. The static temperature $T$ at the nozzle outlet at the chosen radius $r$ may be calculated by the expression $$T = T_t - \frac{V^2}{2gJc_p} \qquad (11)$$

where $J$ is the heat energy-mechanical energy equivalency factor, and $c_p$ is the constant pressure specific heat.

By the initial fixing of tangential Mach number inversely proportional to radius, we recall from Equation 2 that $$M_U = M_{UR}\left(\frac{r_R}{r}\right) \qquad (2)$$

Now since $$M_U = \frac{V_U}{V_S} \qquad (5)$$

Equation 2 may be expressed as $$V_U = V_{UR}\left(\frac{V_S}{V_{SR}}\right)\left(\frac{r_R}{r}\right) \qquad (12)$$

And since $$V_S = \sqrt{kgR_gT}$$

Equation 12 may be further expressed as $$V_U = V_{UR}\left(\frac{\sqrt{T}}{\sqrt{T_R}}\right)\left(\frac{r_R}{r}\right) \qquad (13)$$

where $T$ and $T_R$ are the static temperatures of the gas at the nozzle exit at any radius $r$, and at the root radius $r_R$ respectively.

We should examine the significance of Equation 13 by comparing it with the free vortex Equation 1. It will be observed that the form is similar to the free vortex equation, with the addition of a compensating factor, which accounts for the difference in static temperature at different radii. Thus, Equation 13 can be used to calculate the absolute tangential velocity component $V_U$ at each chosen radius $r$, since the static temperature $T$ at that radius has been obtained from Equation 11.

Now since the total velocity $V$ and the tangential component $V_U$ of the total velocity is known, the vector diagram can be completed for the bucket entry conditions, either graphically or by solving for the axial component $V_A$ of the velocity by the expression $$V_A = \sqrt{V^2 - V_U^2} \qquad (14)$$

Thus it will be seen that knowing the conditions at the root, the bucket entry angles can be calculated at each radius $r$ by the foregoing procedure. The bucket exit angles for the corresponding entry angles may then be calculated, as will be understood by those skilled in the art, by the use of the energy and flow continuity equations.

Even though the blade angles have been chosen, there still remains considerable latitude in designing the blades, and the cross-sectional shape and dimensions of the blades at each radius must be designed for minimum friction loss and minimum flow separation. In the case of the prior art, free vortex design, as illustrated in FIG. 6, the amount of turning of the fluid is smaller at the tip than at the root, and to minimize the blade losses, the bucket chord is generally made smaller at the tip than at the root. In addition, it should be observed that due to the radial extension of the buckets, the spacing between adjacent buckets, or pitch, is proportional to the radius and hence is greatest at the tip. Hence the "solidity," which is the ratio of chord to pitch and which is used in the art as an aerodynamic design parameter related to the bucket entrance and exit angles, is considerably smaller at the tip than at the root in prior art design.

In contrast, in the present invention the bucket angles defined by the aforementioned method of velocity diagram calculation are such as to require greater turning of the fluid at the tip than at the root, mainly as a consequence of the reversed entrance angle warp, as illustrated in FIG. 8. In this case, the aerodynamic requirements for minimum bucket losses are better suited by constant "solidity" from root to tip, and hence a chord proportional to radius. In addition, the bucket maximum thickness is most suitably made to increase proportional to the chord and hence the radius. This causes the gross cross-sectional area of the bucket to be approximately proportional to the radius squared. The gross area $A$ is preferably caused to vary by the previously stated formula $$A = A_R\left(\frac{r}{r_R}\right)^2 \qquad (3)$$

It is found that causing the gross area to vary in this manner results in a bucket surface having radial elements which substantially converge at the rotor axis. For example, if the bucket cross-section were a circle, the bucket would have a frustoconical shape, with the apex of the cone at the axis of rotation. Of course, the actual bucket shape is much more complicated, but the shape is such that radial line elements in the surface pass substantially through the axis of rotation.

The increase of gross area with increased distance from rotor axis has another important effect which is utilized in designing the bucket to be used with radial temperature gradients. When employed in conjunction with the hollowed-out pocket in the tip of the bucket, the net cross-sectional area $A_N$ can be caused to vary in a complex manner (FIG. 12) in order to make the actual radial stress distribution in the bucket conform closely to the variation of allowable stress with temperature. Referring to FIG. 10 of the drawing, the curve 35 indicates a typical variation of allowable stress on a given bucket material at different temperatures. The curve indicates that for a particular material, the allowable local stress on the material, which may be expressed as allowable p.s.i. for a constant given rupture life of the material, decreases rather rapidly with increase in temperature, at first, and then less rapidly as the temperature becomes higher. Theoretically, as the temperature reached the melting point of the material, there would be, of course, zero allowable tensile stress, since the metal would be a liquid. Curve 35, as shown in FIG. 10, has been reduced by appropriate safety factors in order to compare it with actual bucket stress, and it may therefore be assumed that the actual stress on the bucket may be as high as the allowable stress curve 35, but no higher, without exceeding the preselected safety factor.

Under conventional uniform temperature assumptions, the design might be predicated on a preselected root temperature, wherein the stress might vary from a maximum allowable stress such as C at the root to a zero stress such as D at the tip. It will be readily observed from FIG. 10 that the bucket material has capability for withstanding higher temperatures, moving from root to tip, without exceeding the allowable stress, than are actually being employed with the uniform temperature design.

Suppose now that a radial temperature gradient were provided by the arrangement of FIG. 1 so that the abscissa of FIG. 10 also represents radius from root to tip. Suppose also that the bucket area decreased from root to tip in a manner similar to the conventional free vortex bucket of FIGS. 6 and 7. The actual stress calculated in such a bucket might lie along a line such as E—F. The shape of line E—F is determined by the distribution of the mass of bucket material radially outward of each selected radius r moving from root to tip and upon the cross-sectional area at the same radius, according to the formula $$S = \frac{F}{A_N}$$

where S is the centrifugal stress, F is the force exerted on the bucket cross-section due to the mass of material radially outward at the given radius, and $A_N$ is the net cross-sectional area upon which force F is exerted. For a conventional bucket with a linear variation of area, i.e., area increasing linearly with radius, curve E—F will be slightly concave downward as shown. It will be apparent that the maximum stress curve permissible for a conventional bucket is as shown at I—K, which is parallel to curve EF and tangent to curve 35.

By means of the special bucket shape shown, however, the actual stress in the bucket may be caused to follow a curve such as EGF, which can be made to rather closely approximate the allowable stress/temperature curve 35. Curves EF and curve EGF are for a bucket of the same mass, but the actual stress curve EGF is caused to vary as a more complex function of the radius, and to approximate the allowable stress/temperature curve by means of the special bucket shape of FIGS. 8 and 9, which varies in net area such as seen in FIG. 12. Since most of the mass of the bucket is concentrated in the root, the stress drops rapidly at first along curve EG, which corresponds to the distance from cross-section 23 in FIG. 9 to a cross-section along line 36 at the bottom of pocket 28. Thereafter, the stress is reduced moving toward the tip at a less rapid rate along line GF, which corresponds to the distance from cross-section 36 to cross-section 22 on FIG. 9.

The allowable temperature $T_A$ at each local bucket cross-section at radius r can then be plotted as shown in FIG. 11, from the information contained in FIG. 10. The horizontal scale of FIG. 10 is laid out for a uniform variation of stagnation temperature from root to tip, although other temperature distributions could be employed. At a given radius r, one moves vertically in FIG. 10 to the actual stress of the bucket (on curve EG), horizontally to the allowable stress (on curve 35), and vertically to the allowable temperature $T_A$ at that allowable stress. This process is shown by the dotted path 35a in FIG. 10. r is plotted on the horizontal axis in FIG. 11 and $T_A$ on the vertical axis as taken from FIG. 10. If the actual stress curve EGF on FIG. 10 conformed exactly to curve 35, the resulting curve 36 on FIG. 11 would be a straight line. However, since there is merely a straight line approximation to curve 35, the resulting curve 36 of FIG. 11 has cusps 36a, 36b, which nevertheless cause curve 36 to roughly approximate a straight line.

It can be seen in FIG. 11 that the mean temperature, indicated by line 37, is significantly higher than the temperature on a conventional-shaped bucket with uniform temperature, indicated by the horizontal line 38. Since the mean temperature 37 is substantially higher, there will be correspondingly higher thermal efficiency and specific power output achieved through use of the radial temperature gradient concept of this invention.

Thus it will be seen that this improved design for axial flow turbine blades raises the efficiency by deliberately creating a preselected radial temperature gradient giving temperatures at the bucket tip which are much in excess of the temperatures which could be withstood by the highly stressed root portion of the bucket. The nozzle and bucket are then designed according to the relationship that the tangential Mach number varies inversely as the radius, which enables blade angles to be calculated for radial equilibrium conditions, independently of the actual temperature at each radius. The resulting blade angles, where temperature variation is substantial, give nozzle exit warps and bucket entrance warps which are reversed from those of the conventional free vortex bucket based on constant temperature over the bucket height.

The bucket is additionally constructed to effect operation at radial temperature gradients, by causing the actual local stress in the bucket to conform closely to the curve representing maximum allowable stress with varying temperature for a particular bucket material. This is accomplished by causing the net area to first increase with radius and then to decrease with radius. This allows the actual stress distribution from root to tip to follow an approximation of a curve which is concave upward as in FIG. 10. The reduction of stress takes place at a more rapid rate near the root than near the tip.

This actual stress curve, determined by the net area variation with respect to radius, is caused to approximate the allowable stress curve for the particular bucket material at variable temperatures. Thus, optimum use is made of the bucket material along the entire temperature range from root to tip.

It will be apparent to those skilled in the art that different materials will have different curves for allowable stress vs. temperature, and that the precise variation of gross and net areas required to cause the bucket actual stress to conform to these curves may sometimes have to be resolved by solutions which are highly empirical in nature. There is also the possibility of using temperature variation which is not exactly linear with radius, rather than the simple curve of FIG. 2. Regardless of this fact, however, design of the blade, with the tangential Mach number inversely proportional to radius, is completely independent of the actual local total temperature. It includes correction for the temperature variation, which is not accounted for in the free vortex design. Thus, the temperature profile may be adjusted, as desired, in order to simplify the blade shape for ease of manufacture.

Numerous modifications of the arrangement described here will be apparent to those acquainted with gas turbine design. For instance, many other ways can be found to achieve the desired radial temperature gradient, such as providing multiple sources of fluid at different temperatures, conveyed to the bucket-wheel by concentric annular passages supplied from the various sources.

It is of course desired to cover in the appended claims all such modifications as fall within the true spirit and scope of the invention.

What I claim as new and desire to secure by Letters Patent of the United States is:

1. In an axial flow turbine having at least one rotary bucket-wheel, the combination of
    means defining a flow passage of arcuate cross-section with inner and outer radii from centers at the axis of the bucket-wheel and supplying high-temperature elastic fluid to said bucket-wheel,
    means creating a radial temperature gradient in the fluid in said flow passage whereby the temperature is higher toward the outer radius of said flow passage, and
    a plurality of radially extending nozzle partitions disposed at the end of said flow passage and imparting varying tangential velocity components to the motive fluid at different radii from the axis of the bucket-wheel so that the tangential Mach number of said velocity component varies substantially inversely with the radius from the axis of rotation, and
    a plurality of radially extending, rotatable blades disposed beyond said nozzle partitions and attached to said rotary-bucket wheel, the leading edges of said blades being warped from root to tip toward the plane of rotation so that the entry angles of said blades vary with radius to conform to the fluid leaving said nozzle partitions when the blades are rotating.

2. In an axial flow turbine,
    means defining a flow passage of arcuate cross-section with inner and outer radii and supplying high-temperature elastic fluid, means creating a radial temperature gradient in said flow passage wherein the temperature is higher toward the outer radius of said flow passage, a plurality of radially extending nozzle partitions disposed at the end of said flow passage and imparting varying tangential velocity components to the motive fluid at different radii, so that the tangential Mach numbers of said velocity components vary inversely with the radius, and a plurality of radially extending rotatable blades disposed beyond said nozzle partitions, said blades having entry angles varying with radius to conform to the fluid leaving said nozzle partitions when the blades are rotating.

3. In an axial flow turbine, means defining a flow passage of arcuate cross-section with inner and outer radii and supplying high-temperature elastic fluid, means creating a radial temperature gradient in said flow passage, wherein the temperature is higher toward the outer radius of the flow passage, a plurality of radially extending nozzle partitions disposed at the end of the flow passage and imparting varying tangential velocity components to the motive fluid at different radii, so that the tangential Mach numbers of said velocity components vary inversely with the radius, and a plurality of radially extending rotatable turbine buckets disposed beyond said nozzle partitions, said buckets having varying entry angles at different radii to conform to the flow of motive fluid leaving the nozzle partitions when the buckets are rotating, said buckets becoming thicker and having a gross cross-sectional area which increases with increasing radius.

4. In an axial flow turbine, means defining a flow passage of arcuate cross-section with inner and outer radii and supplying high-temperature elastic fluid, means creating a radial temperature gradient in said flow passage, comprising a radially directed jet of lower temperature fluid introduced from the inner radius of said flow passage, a plurality of radially extending nozzle partitions disposed at the end of said flow passage and imparting varying tangential velocity components to the elastic fluid at different radii, so that the tangential Mach numbers of said velocity components vary inversely with the radius, and a plurality of radially extending rotatable turbine buckets disposed beyond said nozzle partitions and having varying entry angles at different radii to conform to the flow of elastic fluid leaving said nozzle partitions, when the buckets are rotating, said buckets having a gross cross-sectional area as seen by the elastic fluid which increases with radius, said buckets also defining hollowed-out recesses in the outer portions thereof, whereby the net cross-sectional area of the bucket first increases and then decreases with increasing radius.

5. In an axial flow turbine, means defining a flow passage of arcuate cross-section with inner and outer radii and supplying high-temperature elastic fluid, means creating a radial temperature gradient in said flow passage, wherein the stagnation temperature is higher toward the outer radius of said flow passage, and a plurality of radially extending nozzle partitions disposed at the end of said flow passage and imparting varying tangential velocity components $V_U$ to the elastic fluid at different radii $r$ at the gas static temperatures T corresponding to those radii, according to the expression $$V_U = V_{UR}\left(\frac{\sqrt{T}}{\sqrt{T_R}}\right)\left(\frac{r_R}{r}\right)$$

where $V_{UR}$ and $T_R$ are tangential velocity component and static temperature respectively at a reference radius $r_R$, and a plurality of radially extending rotatable blades disposed beyond said nozzle partitions, said blades having entry angles varying with radius to conform to the fluid leaving said nozzle partitions when the blades are rotating.

6. In an axial flow turbine, means defining a flow passage of arcuate cross-section with inner and outer radii, and supplying high-temperature elastic fluid, means creating a radial temperature gradient in said flow passage, wherein the temperature is higher toward the outer radius of the flow passage, a plurality of radially extending nozzle partitions disposed at the end of said flow passage and imparting varying tangential velocity components to the elastic fluid at different radii, so that the tangential Mach numbers of said velocity components vary inversely with the radius, and plurality of radially extending rotatable turbine buckets disposed beyond and conforming to the fluid flow leaving said nozzle partitions, each of said buckets having a gross cross-sectional area exposed to the elastic fluid which increases with increasing radius, and also defining a recess in the outer portion thereof, whereby the radial centrifugal stress on said buckets decreases rapidly at first near the root and then decreases less rapidly near the tip, the radial centrifugal stress distribution in said buckets being selected to substantially approximate the allowable stress/temperature curve for the bucket material over the range of temperature in said flow passage.

7. A turbine bucket having a vane portion with a root and a tip, and designed for operation in an elastic fluid whose temperature is substantially greater at the vane tip than at the vane root, said vane portion being constructed so as to increase in gross cross-sectional area from root to tip and defining a recess in the outer portion thereof which increases in size from a midportion of the vane to the tip so that the vane has a net cross-sectional area which first increases and then decreases with radius, whereby the actual centrifugal stress on the vane decreases more rapidly with increase in radius near the root and then less rapidly with increase in radius near the tip, said vane being fabricated from a material in which the allowable stress decreases rapidly with increase in temperature at a lower temperature and then less rapidly with increase in temperature at a higher temperature, the change in net cross-sectional area of the vane being selected so that the changing rate of decrease in centrifugal stress on the vane approximates the changing rate of decrease in allowable stress of the material over a temperature range corresponding to the range of vane temperatures from root to tip.

8. In an axial flow turbine for operation with motive fluid having a substantial radial temperature gradient, a plurality of stationary nozzle partitions having radially inner roots and radially outer tips, said nozzle partitions defining fluid exit angles which vary gradually from root to tip so as to direct the fluid leaving the tips in a more tangential direction than the fluid leaving the roots, and a plurality of rotating buckets receiving motive fluid from said nozzle partitions, said buckets having radially inner roots and radially outer tips and defining bucket entry angles which vary gradually from root to tip in a manner such that the bucket tips provide a greater turning of the motive fluid than do the bucket roots, said buckets also becoming thicker from root to tip and defining recesses extending from the tips substantially halfway to the roots.

References Cited in the file of this patent

UNITED STATES PATENTS

| | | |
|---|---|---|
| 1,456,085 | Wilkinson | May 22, 1923 |
| 2,757,902 | Slivka et al. | Aug. 7, 1956 |
| 2,786,646 | Grantham | Mar. 26, 1957 |
| 2,806,355 | Schorner | Sept. 17, 1957 |

FOREIGN PATENTS

| | | |
|---|---|---|
| 612,838 | Great Britain | Nov. 18, 1948 |
| 751,954 | Great Britain | July 4, 1956 |
| 753,561 | Great Britain | July 25, 1956 |
| 868,100 | Great Britain | May 17, 1961 |

OTHER REFERENCES

Shepherd, D. G.: Principles of Turbomachinery, N.Y., MacMillan, 1956, pages 345–347. TJ 267.S35.

Judge, A. W.: Gas Turbines for Aircraft, London, Chapman and Hall Ltd. 1958, pages 357–360. TL 709.3. T83.J8.